G. Knowlton,
Potato Planter.
No. 112,470.  Patented Mar. 7, 1871.
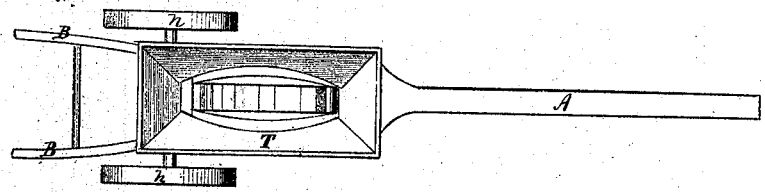
Fig. 1.
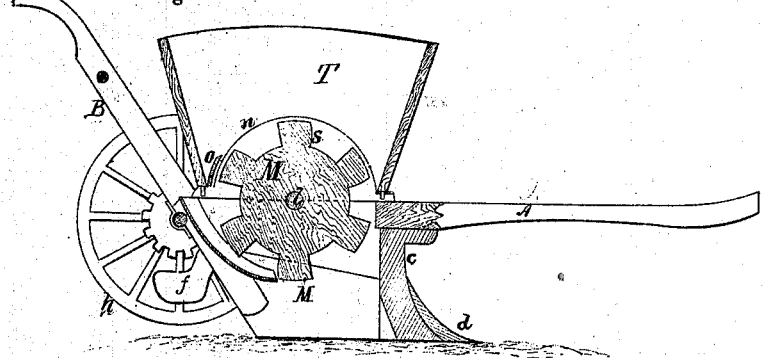
Fig. 2.
Fig. 5.
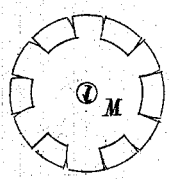
Fig. 3.
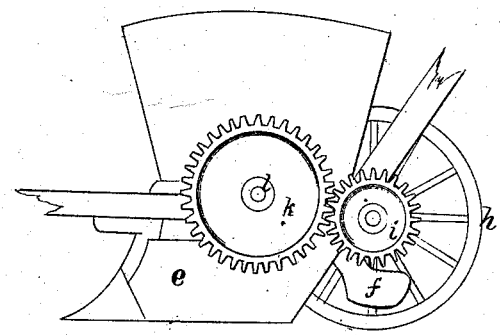
Fig. 4.
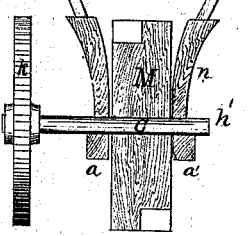
Fig. 6.
Witnesses.  
Chas. Kenyon  
Villetto Anderson
Inventor.  
G. Knowlton,  
Chipman Hosmer & Co.  
Attys.

United States Patent Office.

GEORGE KNOWLTON, OF JOHNSTOWN, PENNSYLVANIA, ASSIGNOR FOR ONE-HALF HIS RIGHT TO N. HAYNES, OF SAME PLACE.

Letters Patent No. 112,470, dated March 7, 1871.

IMPROVEMENT IN POTATO-PLANTERS.

The Schedule referred to in these Letters Patent and making part of the same.

*To all whom it may concern:*

Be it known that I, GEORGE KNOWLTON, of Johnstown, in the county of Cambria and State of Pennsylvania, have invented a new and valuable Improvement in Potato-Planter; and I do hereby declare that the following is a full, clear, and exact description of the construction and operation of the same, reference being had to the annexed drawing making a part of this specification, and to the letters and figures of reference marked thereon.

Figure 1 of the drawing is a top view of my invention.

Figure 2 is a central vertical longitudinal section thereof.

Figures 3, 4, 5, and 6 are details.

This invention relates to improvements in machines for planting potatoes; and

It consists in a combination of devices for that purpose, hereinafter fully described, the object being to produce a machine simple in construction, which, by being drawn along and held in position, will, by its automatic operation, form the furrow, drop the potatoes in rows or hills, and cover them.

Referring to the accompanying drawing—

The frame A has attached to its rear the handles B, and to its under side a support, c, on which is placed the shoe or cultivator d.

To the support c, in the rear of the shoe d, and on each side of the support, are connected the mold-boards e, which are also fastened at their ends to the handles B.

Above the mold-boards e, and cast in the same piece therewith, are the backward and downward-projecting coverers f, which are so placed, shaped, and bent as to draw or scrape the soil, which is thrown up by the shoe and mold-boards in making the furrow in which the potatoes are dropped, back into the furrow, and thus cover the potatoes.

Above the scrapers, and on the rear of the handles and frame, suitable bearings are supplied for the revolving axle g. At the extremities of the axle the driving-wheels h are placed, and fixed to turn with the axle. When the machine is drawn along these driving-wheels serve as supports, and as they revolve, in consequence of being upon the ground, motion is transmitted to the axle and to the pinion-wheel i fixed upon it.

The pinion i is connected with the cog-wheel k and transmits motion to it.

The cog-wheel k is fixed upon and communicates motion to the shaft l, which is supported in suitable bearings on the frame A, and which carries and communicates motion to the cylinder M.

The frame A is widened at its rear, and formed into two arms for the support of the handles B and the shaft l, as shown at a and a', fig. 4.

Over this portion of the frame is placed a rectangular frame having curved projecting side-boards n, for the purpose of keeping the shaft l in place and the potatoes from falling off the cylinder M.

At the rear and base of these side-boards, and fitted to them, is the knife o, which serves to prevent the cylinder from clogging.

Connected to the rear end of the frame A and the inside of the handles B is the chute p, which serves to conduct the potatoes from the cylinder to the furrow.

The cylinder M is in the general form shown in fig. 2, and has on its face, at intervals, projections s, which cause the potatoes, as the cylinder revolves, to drop at intervals; and in order to cause the potatoes to drop in two rows alternately, or in one zigzag line, two rows of projections placed alternately in the rows, as shown in fig. 5, are used on the cylinder.

Over the projecting side-boards n may be placed a hopper, y, secured in the frame by means of pins. Into this hopper the potatoes, prepared in a suitable manner or cut in the usual way, are thrown, and as the machine is drawn along the operation of planting them is automatically effected.

I claim as my invention—

The plow, the coverers, and cylinder, constructed and combined substantially as and for the purposes set forth In testimony that I claim the above I have hereunto subscribed my name in the presence of two witnesses.

GEORGE KNOWLTON.

Witnesses:
IRVIN RUTLEDGE,
S. M. RAINEY.